(12) United States Patent
Liu et al.

(10) Patent No.: US 6,331,100 B1
(45) Date of Patent: Dec. 18, 2001

(54) DOUBLED BOWED COMPRESSOR AIRFOIL

(75) Inventors: Hsin-Tuan Liu, West Chester; Robert B. Dickman, Cincinnati; Kenneth W. Krabacher, Hamilton; Gregory T. Steinmetz, Cincinnati; Brent F. Beacher, Hamilton; Bryan K. Doloresco, Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/455,826

(22) Filed: Dec. 6, 1999

(51) Int. Cl.$^7$ ........................................................ F01D 5/14
(52) U.S. Cl. .......................... 416/238; 416/242; 416/243; 416/223 A
(58) Field of Search .............................. 416/223 A, 238, 416/242, 243

(56) References Cited

U.S. PATENT DOCUMENTS

| | | |
|---|---|---|
| 2,663,493 | 12/1953 | Keast . |
| 4,585,395 | 4/1986 | Nourse et al. . |
| 4,682,935 | 7/1987 | Martin . |
| 4,737,077 * | 4/1988 | Vera ........................................ 416/242 |
| 5,088,892 | 2/1992 | Weingold et al. . |
| 5,249,922 | 10/1993 | Sato et al. . |
| 5,342,170 | 8/1994 | Elvekjaer et al. . |
| 5,641,268 | 6/1997 | Martin et al. . |
| 5,779,443 | 7/1998 | Haller et al. . |
| 6,071,077 * | 6/2000 | Rowlands .......................... 416/223 A |

OTHER PUBLICATIONS

U.S. Patent Ser. No. 09/455,828, filed Dec. 6, 1999, "Bowed Compressor Airfoil".

* cited by examiner

Primary Examiner—Edward K. Look
Assistant Examiner—Ninh Nguyen
(74) Attorney, Agent, or Firm—Andrew C. Hess; Nathan D. Herkamp

(57) ABSTRACT

A compressor airfoil includes pressure and suction sides extending from root to tip and between leading and trailing edges. Transverse sections have respective chords and camber lines. Centers of gravity of the sections are aligned along a double bowed stacking axis for improving performance.

12 Claims, 3 Drawing Sheets

DOUBLED BOWED COMPRESSOR AIRFOIL

BACKGROUND OF THE INVENTION

The present invention relates generally to gas turbine engines, and, more specifically, to compressors or fans therein.

In a turbofan aircraft gas turbine engine, air is pressurized in a fan and compressor during operation. The fan air is used for propelling an aircraft in flight. The air channeled through the compressor is mixed with fuel in a combustor and ignited for generated hot combustion gases which flow through turbine stages that extract energy therefrom for powering the fan and compressor.

A typical turbofan engine includes a multistage axial flow compressor which pressurizes the air sequentially to produce high pressure air for combustion. The compressed air is diffused and decelerates as it is compressed. Compressor airfoils must therefore be designed to reduce undesirable flow separation which would adversely affect stall margin and efficiency.

Conversely, combustion gases are accelerated through the turbine stages, and the turbine blades have different aerodynamic designs for maximizing efficiency of energy extraction.

Fundamental in compressor design is efficiency in compressing the air with sufficient stall margin over the entire flight envelope of operation from takeoff, cruise, and landing.

However, compressor efficiency and stall margin are normally inversely related with increasing efficiency typically corresponding with decrease in stall margin. The conflicting requirements of stall margin and efficiency are particularly demanding in high performance military engine applications which require high level of stall margin typically at the expense of compressor efficiency, as opposed to less demanding commercial applications.

Maximizing efficiency of compressor airfoils is primarily effected by optimizing the velocity distributions over the pressure and suction sides of the airfoil. However, efficiency is typically limited in conventional compressor design by the requirement for a suitable stall margin. Any further increase in efficiency typically results in a reduction in stall margin, and, conversely, further increase in stall margin results in decrease in efficiency.

High efficiency is typically obtained by minimizing the wetted surface area of the airfoils for a given stage to correspondingly reduce airfoil drag. This is typically achieved by reducing airfoil solidity or the density of airfoils around the circumference of a rotor disk, or by increasing airfoil aspect ratio of the span to chord lengths.

For a given rotor speed, this increase in efficiency reduces stall margin. To achieve high levels of stall margin, a higher than optimum level of solidity and/or lower than optimum aspect ratios may be used, along with designing the airfoils at below optimum incidence angles. This reduces axial flow compressor efficiency.

Increased stall margin may also be obtained by increasing rotor speed, but this in turn reduces efficiency by increasing the airflow Mach numbers, which increases airfoil drag.

And, compressor blades are subject to centrifugal stress which is affected by aerodynamic design. Peak stress must be limited for obtaining useful blade life, and this in turn limits the ability to optimize aerodynamic performance.

Accordingly, typical compressor designs necessarily include a compromise between efficiency and stall margin favoring one over the other, which are further affected by allowable centrifugal stress.

It is, therefore, desired to further improve both compressor efficiency and stall margin while limiting centrifugal stress for improving gas turbine engine compressor performance.

BRIEF SUMMARY OF THE INVENTION

A compressor airfoil includes pressure and suction sides extending from root to tip and between leading and trailing edges. Transverse sections have respective chords and camber lines. Centers of gravity of the sections are aligned along a double bowed stacking axis for improving performance.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
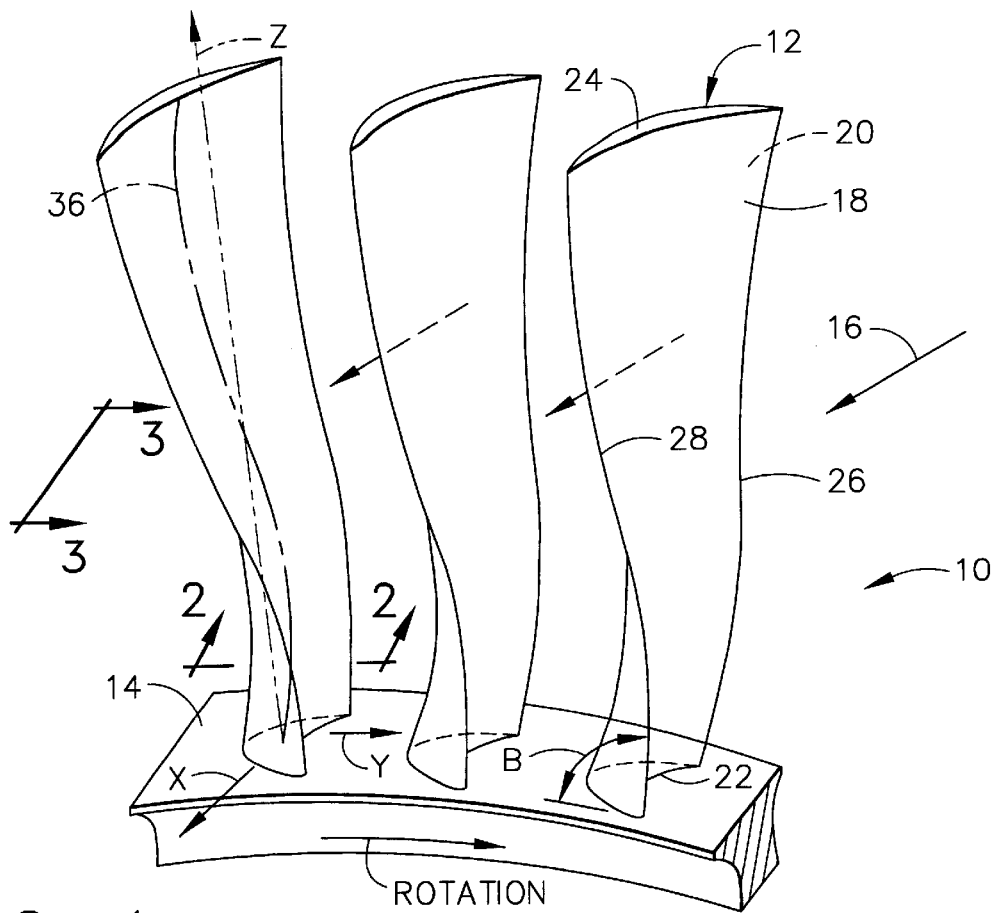
FIG. 1 is an isometric view of a portion of a gas turbine engine compressor rotor stage having bowed airfoils extending radially outwardly from an integral rotor disk in accordance with an exemplary embodiment of the present invention.

Illustrated in FIG. 1 is a portion of an annular rotor blisk 10 defining one stage of a multistage axial flow compressor for a gas turbine engine. The blisk includes a plurality of circumferentially spaced apart rotor blades or airfoils 12 extending radially outwardly from the perimeter of an integral rotor disk 14 forming a one-piece unitary assembly. The blisk may be manufactured using conventional milling and electrochemical machining.

Alternatively, the airfoils may be formed with integral dovetails for being removably mounted in corresponding dovetail slots in the perimeter of discrete rotor disk in another conventional configuration.

During operation, the blisk rotates in the exemplary clockwise direction illustrated in FIG. 1 for pressurizing air 16 as it flows between the adjacent airfoils. The airfoils are aerodynamically configured in profile for maximizing the efficiency of air compression while also providing a suitably high stall margin for enhancing performance of the compressor. The blisk 10 illustrated in FIG. 1 is only one of several stages of rotor airfoils which may be configured in accordance with the present invention for enhancing compressor performance by increasing together both efficiency and stall margin, within allowable centrifugal stress limits.

Notwithstanding the conventional compromise made between aerodynamic efficiency and stall margin, modern computer software is conventionally available for solving three-dimensional (3D) viscous flow equations for evaluating airfoil performance. The resulting airfoils generally have distinctive 3D configurations which differ significantly over conventional airfoils which vary less in radial section over the spans thereof.

FIG. 1 illustrates a specifically doubled bowed airfoil 12 uncovered from 3D analysis having improved performance for increasing both efficiency and stall margin not previously possible due to stress limits.

The rotor disk 14 has three orthogonal axes including axial X, tangential or circumferential Y, and radial Z. The axial axis X extends in the downstream direction relative to the flow of air 16 through the compressor. The tangential axis Y extends in the direction of rotation of the disk and airfoils. And, the radial axis Z extends radially outwardly from the perimeter of the disk for each of the airfoils thereon.

Each airfoil 12 includes a generally concave pressure side 18 and a generally convex suction side 20 extending radially or longitudinally from a root or hub 22 integrally joined with the perimeter of the disk to a radially outer tip 24. The two sides extend chordally or axially between leading and trailing edges 26, 28 from root to tip.

In accordance with one feature of the present invention, the airfoil suction side 20 is laterally or tangentially bowed along the trailing edge 28 near or adjacent the root 22 at the intersection with the disk perimeter. Flow separation of the air at this location may be substantially reduced or eliminated for both increasing blade efficiency and improving stall margin.

Figure 2:
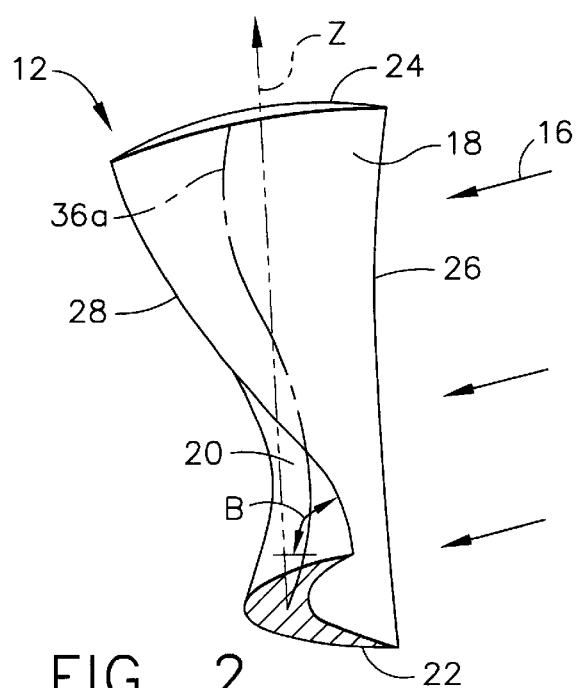
FIG. 2 is an aft-looking-forward isometric view of one of the airfoils illustrated in FIG. 1 and taken generally along line 2—2 in a tangential and radial plane.

The suction side trailing edge is bowed primarily only in the tangential direction as illustrated in FIG. 2. In the side projection of the axial and radial plane X-Z illustrated in FIG. 3, the suction side bow is imperceptible. However, the airfoil may also be axially bowed as illustrated in FIG. 3 for further improvements in performance as later discussed hereinbelow.

Figure 3:
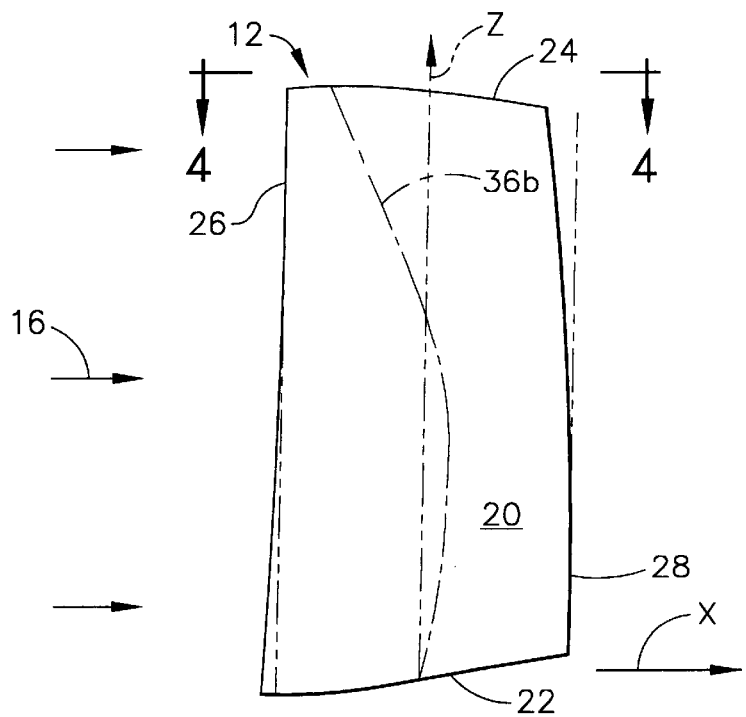
FIG. 3 is a side elevation view of one of the airfoils illustrated in FIG. 1 and taken generally along line 3—3 circumferentially projected in an axial and radial plane.
Figure 4:
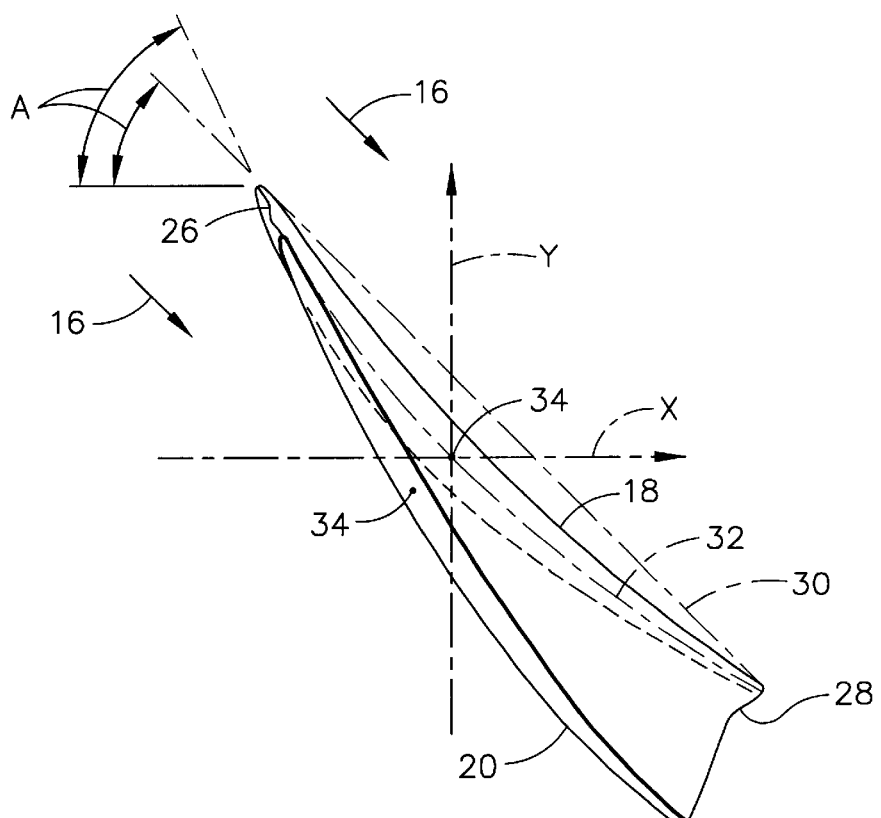
FIG. 4 is a top view of the airfoil illustrated in FIG. 3 and taken along line 4—4.

The airfoil illustrated in FIGS. 1–3 is defined by a plurality of radially or longitudinally stacked transverse sections from root to tip as illustrated in FIG. 4. Each section has an aerodynamic profile defined by respective portions of the pressure and suction sides 18,20 extending between the leading and trailing edges 26,28. Each profile is defined by a straight chord 30 extending axially between the leading and trailing edges, and an arcuate camber line 32 which is a meanline spaced equidistantly between the pressure and suction sides from leading to trailing edge.

The compressor airfoil 12 typically twists from root to tip for maximizing compressor performance. The twist is defined by a stagger angle A measured between the chord 30 and axial axis X at the leading edge 26, for example, for each radial section. The stagger typically increases from root to tip, and is larger at the tip than at the root.

Each airfoil section also has a center of gravity 34 which is aligned radially along the longitudinal span of the airfoil in a stacking axis 36 as illustrated in FIG. 1 which is preferably double bowed in the tangential direction in accordance with another feature of the present invention. The stacking axis 36 in conjunction with the shapes of the corresponding airfoil sections including their chords 30 and camber lines 32 permit 3D definition of the airfoil for enhanced performance in accordance with the present invention.

Figure 5:
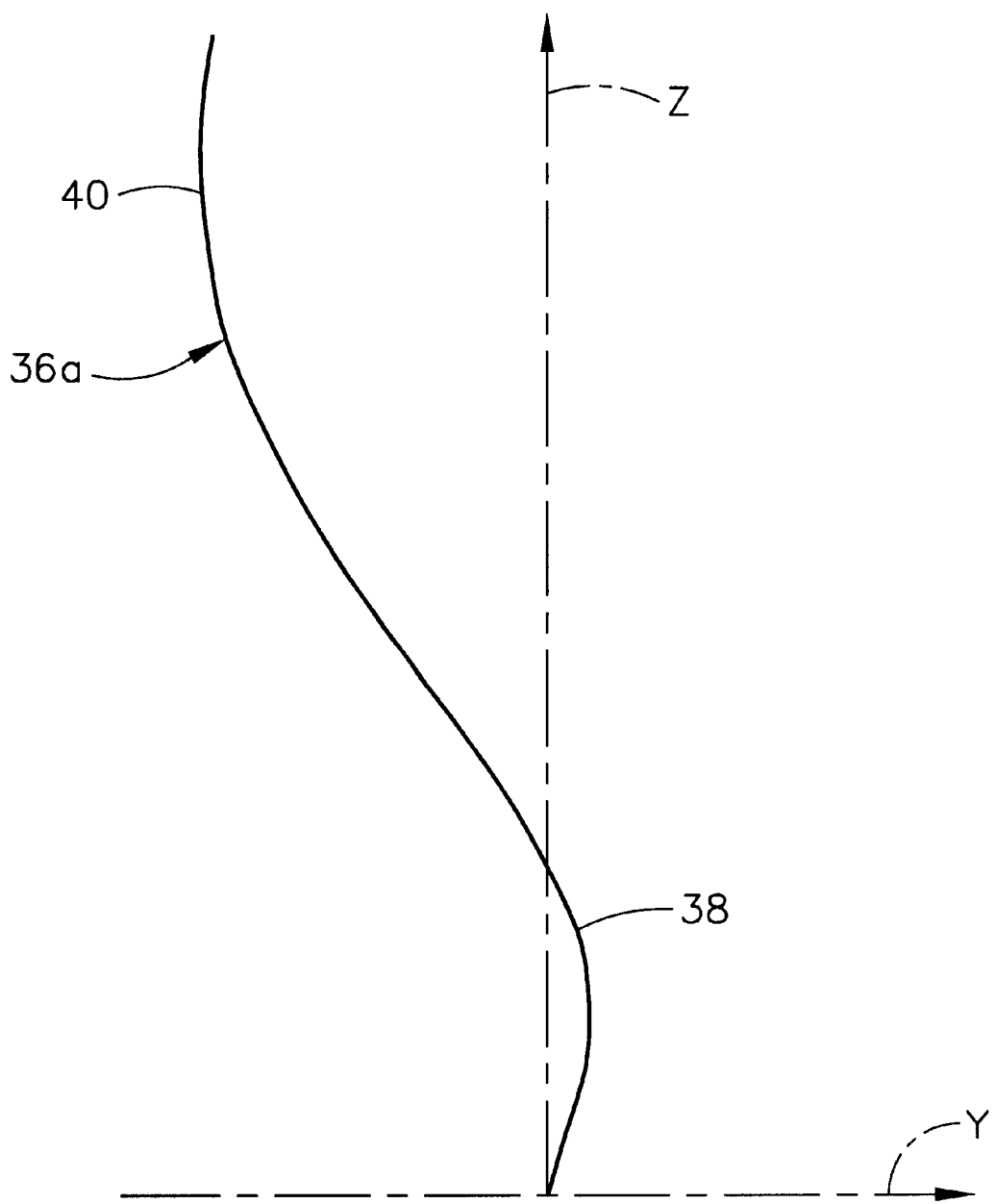
FIG. 5 is a graph of an exemplary double bowed tangential stacking axis for the airfoil illustrated in FIGS. 1–4.

More specifically, the stacking axis 36 illustrated in FIG. 1 has two orthogonal components including a tangential stacking axis 36a illustrated in FIGS. 2 and 5, and an axial stacking axis 36b illustrated in FIG. 3. The tangential stacking axis 36a is non-linear or bowed adjacent the airfoil root 22 to bow the suction side 20 of the airfoil near the trailing edge root or hub.

As shown in FIGS. 1 and 5, the tangential stacking axis 36a includes a first inversion or bow 38 having an initial lean onward or in the forward direction of rotation of the airfoils and disk from the root 22 toward the pressure side 18 of the airfoil. The first bow 38 then reverses lean backward toward the radial axis Z.

The stacking axis 36a also includes a second inversion or bow 40 which leans hindward or backward past the radial axis Z from the first bow, opposite to the direction of rotation of the airfoils and disk, toward the suction side 20 adjacent the tip 24. The second bow then reverses lean forward toward the radial axis Z. Correspondingly, stagger angle of the airfoil transverse sections adjacent the root varies in turn to bow the suction side along the trailing edge suction side.

The double bow of the tangential stacking axis 36a thusly has a generally S-shape, and the corresponding shapes of the transverse sections are selected for substantially reducing or eliminating flow separation of the air along the suction side near the airfoil hub at the trailing edge, while also reducing centrifugal stress. For example, the trailing edge 28 also has a generally S-shape from root to tip.

The S-bowed stacking axis permits the trailing edge 28 as illustrated in FIGS. 1 and 2 to be oriented substantially normal to the root of the bowed suction side 20 and leans hindward thereabove. The trailing edge 28 intersects the perimeter or platform of the rotor disk at an intersection angle B which would otherwise be significantly acute without the trailing edge bow. Computer analysis indicates that acute trailing edge intersection angles promote hub flow separation which decreases efficiency of the airfoil. The suction side bow reduces the acuteness of the intersection angle B for correspondingly reducing flow separation, with an attendant increase in efficiency.

However, since the airfoil is a 3D design, its various sections are aerodynamically and mechanically interrelated in a complex manner. Accordingly, the shape and amount of tangential lean in the first bow 38 in the direction of rotation are preferably controlled by aerodynamic analysis to eliminate or reduce hub flow separation at the trailing edge. The first bow correspondingly also moves the peak centrifugal stress away from the airfoil root into the airfoil sections at the first bow.

In order to then reduce the centrifugal stress in the first bow region, mechanical or stress analysis may then be used to control the remainder of the tangential stacking axis profile in its transition outboard of the first bow in the direction opposite to rotation. Centrifugal stress at the root and in the first bow region may then be reduced by introducing the second bow 40 which leans the stacking axis once again in the direction of rotation for the airfoil tip region.

The first and second bows 38,40 are disposed on opposite sides of the radial axis Z extending through the center of gravity of the airfoil root to limit peak centrifugal stress while maximizing aerodynamic performance at the root. Both bows include inversion points at which the stacking axis changes direction between onward and hindward. And, the second bow may extend back across the radial axis if required to further reduce centrifugal stress near the root.

The S-bowed stacking axis thusly permits centrifugal loads developed during operation to slightly straighten the airfoil and introduce local compressive bending stress which locally offsets centrifugal tensile stress.

Accordingly, the preferentially bowed airfoil reduces flow separation at the hub, and is limited only by the degree of stacking axis bow which may be introduced with acceptable bending stresses during operation. The outboard second bow permits the inboard first bow to incline greater than it otherwise could. Improved hub airflow increases airfoil efficiency without compromising stall margin, both within acceptable stress limits.

Aerodynamic sweep is a conventional parameter for evaluating performance of a compressor airfoil. Aft sweep may be limited by configuring the airfoil leading edge 26 to have an axially coplanar radially outer or outboard portion which includes the tip 24 as illustrated in FIG. 3. And, the remaining radially inner or inboard portion of the leading edge 26 is inclined axially forwardly to the root 22 from the outboard portion.

FIG. 3 illustrates an axial projection of the airfoil 12 from its suction side 20 and shows a straight leading edge outboard portion which is preferably positioned at a constant axial location. The inboard portion of the leading edge 26 leans forward as the airfoil root is approached relative to the radial line illustrated in phantom. Aerodynamic aft sweep of the airfoil is thusly limited at the leading edge from the root to the tip of the airfoil.

Aft aerodynamic sweep may be further limited by preferentially configuring the airfoil trailing edge 28 as illustrated in FIG. 3. The axial stacking axis 36*b* in conjunction with corresponding chord lengths may be used to control trailing edge configuration. In a preferred embodiment, the trailing edge 28 has an axially coplanar inboard portion including the root 22, and an outboard portion inclined axially forwardly to the tip 24 from the inboard portion.

Since the stacking axis includes both tangential and axial components, the tangential component may be used to advantage to introduce the bowed suction side 20 near the trailing edge at the root as illustrated in FIGS. 1 and 2 for the advantages described above. Correspondingly, the axial component of the stacking axis may be selected for limiting the aft sweep along both the leading and trailing edges 26,28 as illustrated in FIG. 3. The stacking axis is configured in conjunction with the shapes of the individual transverse sections of the airfoil including the distribution in length of the chords 30 and the camber of the camber lines 32.

Accordingly, the two components of the stacking axis and the shape of the airfoil transverse sections may be additionally configured based on 3D viscous flow analysis to increase both airfoil efficiency and stall margin, while controlling centrifugal stress, resulting in the distinctive 3D configuration illustrated in the figures.

The degree of suction side bow and S-stack may be adjusted in different combinations for different airfoil configurations to vary the benefits of increased aerodynamic performance and reduced centrifugal stress. The resulting airfoil 12 may thusly be designed for truly three dimensional performance attributable to modern advances in computational analysis which makes such improvements possible.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A compressor airfoil for a rotor disk having axial, tangential, and radial orthogonal axes, comprising:

pressure and suction sides extending radially from root to tip, and axially between leading and trailing edges;

transverse sections having respective chords and camber lines extending between said leading and trailing edges, and centers of gravity aligned in a double bowed stacking axis;

said stacking axis having two orthogonal components including a tangential stacking axis and an axial stacking axis; and said tangential stacking axis includes a first bow having an initial lean onward from said root toward said pressure side, and a second bow joining said first bow and leaning hindward toward said suction side adjacent said tip, and stagger of said sections adjacent said root varies to bow said suction side thereat and reduce flow separation.

2. An airfoil according to claim 1 wherein said onward lean is in the direction of rotation of said airfoil atop said disk, and said hindward lean is opposite to said direction of rotation.

3. An airfoil according to claim 1 wherein said trailing edge is oriented substantially normal to said root at said bowed suction side, and leans hindward thereabove.

4. An airfoil according to claim 1 wherein said first and second bows are disposed on opposite sides of said radial axis extending through said airfoil root.

5. An airfoil according to claim 1 wherein said stagger increases from root to tip.

6. An airfoil according to claim 1 wherein said tangential stacking axis has a generally S-shape from root to tip.

7. An airfoil according to claim 1 wherein said trailing edge has a generally S-shape from root to tip.

8. A compressor airfoil for a rotor disk having axial, tangential, and radial orthogonal axes, comprising:

pressure and suction sides extending radially from root to tip, and axially between leading and trailing edges;

transverse sections having respective chords and camber lines extending between said leading and trailing edges, and centers of gravity aligned in a bowed stacking axis;

said suction side being bowed along said trailing edge adjacent said root for reducing flow separation thereat; and wherein said stacking axis has two orthogonal components including a tangential stacking axis and an axial stacking axis, and said tangential stacking axis is double bowed to bow said suction side along said trailing edge at said root, and said axial stacking axis has a single bow inclined forwardly toward said leading edge at said tip for limiting aft aerodynamic sweep along both said leading and trailing edges from said root to tip.

9. A compressor rotor airfoil comprising a double bowed tangential stacking axis and a single bowed axial stacking axis orthogonal thereto, and a suction side bowed along a trailing edge adjacent a root for reducing flow separation thereat.

10. An airfoil according to claim 9 wherein said stacking axis has a generally S-shape, and said trailing edge has a generally S-shape.

11. An airfoil according to claim 10 wherein said trailing edge is oriented substantially normal to said root at said bowed suction side.

12. An airfoil according to claim 11 wherein said trailing edge leans from said bowed suction side to a tip of said airfoil.

* * * * *